(12) United States Patent
Hosseini et al.

(10) Patent No.: US 8,446,452 B2
(45) Date of Patent: May 21, 2013

(54) VIDEO RATE ADAPTATION FOR CONGESTION CONTROL

(75) Inventors: Mojtaba Hosseini, Ottawa (CA); Patrick White, Renfrew (CA)

(73) Assignee: Magor Communications Corporation, Ottawa, ON (CA)

( * ) Notice: Subject to any disclaimer, the term of this patent is extended or adjusted under 35 U.S.C. 154(b) by 1230 days.

(21) Appl. No.: 12/289,946

(22) Filed: Nov. 7, 2008

(65) Prior Publication Data

US 2010/0118114 A1 May 13, 2010

(51) Int. Cl.
*H04N 7/14* (2006.01)
*H04L 1/00* (2006.01)
*H04L 12/16* (2006.01)

(52) U.S. Cl.
USPC ............ 348/14.08; 348/14.12; 348/14.15; 370/229; 370/260

(58) Field of Classification Search
USPC ........... 348/14.12; 370/229, 233, 235, 263, 370/270, 464, 465, 468; 379/93.08, 93.33
See application file for complete search history.

(56) References Cited

U.S. PATENT DOCUMENTS

| | | | | |
|---|---|---|---|---|
| 7,142,506 B1 * | 11/2006 | Pogrebinsky | ............ | 370/229 |
| 7,876,789 B2 * | 1/2011 | Synnergren et al. | ........ | 370/503 |
| 8,305,914 B2 * | 11/2012 | Thielman et al. | ........ | 370/252 |
| 2002/0071052 A1 * | 6/2002 | Itoh et al. | ............ | 348/384.1 |
| 2003/0222973 A1 * | 12/2003 | Hiroi et al. | ........ | 348/14.01 |
| 2004/0240390 A1 | 12/2004 | Seckin | | |
| 2006/0018257 A1 * | 1/2006 | Seo | ............ | 370/232 |
| 2006/0176832 A1 * | 8/2006 | Miceli | ............ | 370/260 |
| 2007/0277221 A1 | 11/2007 | Davis et al. | | |
| 2008/0144724 A1 | 6/2008 | Luo et al. | | |
| 2008/0170500 A1 | 7/2008 | Ito et al. | | |
| 2008/0187054 A1 * | 8/2008 | Kurosawa | ........ | 375/240.26 |

OTHER PUBLICATIONS

Ramana Isukapalli, "Efficient Real Time Content Delivery on Wireless Networks", IEEE 2007, pp. 371-375, New Jersey, USA.
ISA/CA, "International Search Report", dated Jan. 7, 2010, pp. 1 to 3.
N. Cranley and Liam Murphy, "Adaptive Quality of Service for Streamed MPEG-4 over the Internet", Proceedings of IEEE ICC2001: International Conference on Communications. Helsinki, Finland. Jun. 11-15, 2001, p. 1206-1210.

(Continued)

*Primary Examiner* — George Eng
*Assistant Examiner* — Nam Huynh
(74) *Attorney, Agent, or Firm* — Marks & Clerk; Richard J. Mitchell (57) ABSTRACT

Exchanging of videoconference data between a first endpoint and a second endpoint via a network includes receiving, at the first endpoint, statistical data relating to transmission of first videoconference data. In particular, the first videoconference data is data that is transmitted previously from the first endpoint to the second endpoint via the network, and the statistical data relates to network performance characteristics during transmission of the first videoconference data. An approximately optimized data transmission rate for the network performance characteristics is determined, based on the statistical data. The output bit rate of a video encoder associated with the first endpoint is adjusted, such that second videoconference data, relating to the same videoconference at a time that is later than the first videoconference data, is encoded to provide output data at an adjusted output bit rate for being transmitted via the network at approximately the optimized data transmission rate.

24 Claims, 5 Drawing Sheets

OTHER PUBLICATIONS

S. Floyd, M. Handley, J. Padhye, J. Widmer, "Equation-Based Congestion Control for Unicast Applications", Proceedings of ACM conference on Applications, technologies, architectures, and protocols for computer communications (SIGCOMM), Stockholm, Sweden. Aug. 28-Sep. 1, 2000, pp. 43-56.

E. Kohler, M. Handley, S. Floyd, "Designing DCCP: congestion control without reliability", Proceedings of ACM conference on Applications, technologies, architectures, and protocols for computer communications (SIGGOMM), Pisa, Italy, Sep. 11-15, 2006, pp. 27-38.

* cited by examiner

VIDEO RATE ADAPTATION FOR CONGESTION CONTROL

FIELD OF THE INVENTION

The instant invention relates generally to videoconferencing, and more particularly to dynamically adjusting video encoding and input parameters for enhancing a videoconferencing experience over a best effort network.

BACKGROUND OF THE INVENTION

A videoconference is a set of interactive telecommunication technologies which allow two or more locations to interact via two-way simultaneous video and audio transmissions. The core technology that is used in a videoconference system is digital compression of audio and video streams in real time. The other components of a videoconference system include: video input i.e. a video camera or webcam; video output i.e. a computer monitor, television or projector; audio input i.e. microphones; audio output i.e. usually loudspeakers associated with the display device or telephone; and, data transfer i.e. analog or digital telephone network, LAN or Internet.

In general, the videoconferencing market is divided loosely into two groups: those users that are willing to incur significant expense; and, those users that are not willing to incur expense. Some examples of users that are willing to incur significant expense include large and/or global corporations and public services, which are able to justify the expense on the basis of avoiding the cost and lost time that is associated with travel. The expense that is incurred comes from the cost of ownership or the cost of leasing a private network. Such a private network is managed, delivering a quality of service (QoS) often forming part of a Service Level Agreement (SLA).

The balance of the market, which includes those users without access to private networks, typically uses the Internet for data transmission. This group includes not only those users with no access to private networks, but also those users whose private networks do not provide QoS guarantees or do not connect to all endpoints to which the user may wish to connect. The Internet is an example of a best-effort network. Such a network differs from a managed-network in that transmission parameters of the best-effort network are subject to relatively large and variable transmission impairments, including jitter, delays, lost packets, etc., as a result of network congestion. Furthermore, these impairments typically are subject to sudden and significant changes in value, averaged over periods ranging from seconds to minutes or hours.

The transmission impairments that are associated with a best-effort network, such as the Internet, result in a typically uncomfortable experience for the user, due to the video component being "choppy," of poor quality, and/or not precisely synchronized with the audio component of the communication. Rather than enhancing communication, the video component may actually provide false visual cues and even disorient or nauseate those that are party to the communication. For this reason, businesses and individuals have been slow to adopt IP-based videoconferencing despite the many advantages that are associated therewith. Of course, wider adoption is likely to occur when the video-component is improved sufficiently to provide more natural motion and a more life-like representation of the communicating parties. Accordingly, each incremental improvement in the encoding and/or transmission of video data is an important step toward achieving widespread adoption of videoconferencing technologies.

Unfortunately, current endpoint technology and transmission protocols produce a typically poor interactive experience. Using an existing protocol that deals with congestion, such as the Transport Control Protocol (TCP), the video transmission experiences potentially very large delays as a result of retransmission of lost packets, and significant reduction in transmission rate as a result of TCP's Additive Increase Multiplicative Decrease (AIMD) policy towards congestion. As a result, TCP is considered to be an inadequate protocol for transmission of live real-time video streams.

Alternatively, when using an existing protocol with no congestion control such as User Datagram Protocol (UDP), the user experiences severe packet loss in the event of congestion, which significantly reduces the quality of the videoconference experience since loss of compressed video packets results in significant visual artifacts in the decoded image. Continued congestion also significantly increases the delay, as a result of queuing delays, of video packets on the network that is experiencing congestion. As a result, UDP streams are considered to perform inadequately in the presence of network congestion.

Finally, when using the Datagram Congestion Control Protocol (DCCP), which provides congestion control for real-time applications such as audio and video, the video transmission is subject to potentially large buffering delays on the transmitter side in order to adhere to the rate control mechanism of DCCP. Unfortunately, delay is a key parameter in live videoconferencing applications since a long delay in receiving a response from a remote participant diminishes the illusion of a face-to-face conversation. Another problem with DCCP is that packets marked as DCCP are not necessarily routed by core Internet routers, since DCCP has not been widely adopted. Furthermore, DCCP does not address how video encoding parameters are changed in order to adhere to a given transmission rate.

It is also known to provide feedback signals from the recipient to the sender during streaming of audio-video content via a best effort network. These signals contain information relating to bandwidth throughput during a particular transmission interval. More particularly, the video that is being streamed is encoded into multiple quality segments or streamlets. Thus, when the bandwidth throughput does not match the bit rate of the streamlets being sent over the network, the sender stops sending some of the streamlets. Several steps of quality, such as low, medium, medium-high and high, are predefined prior to streaming the audio video content, and moving between different steps results in a noticeable differences in the quality of the video content. This approach is suitable for video-on-demand type applications, which tolerate buffering delays and require reliable packet delivery, but is not considered to be suitable for real-time videoconferencing applications.

It would be advantageous to provide a method and system that overcomes at least some of the above-mentioned limitations of the prior art.

SUMMARY OF EMBODIMENTS OF THE INVENTION

According to an aspect of the instant invention there is provided a method of exchanging videoconference data between a first endpoint and a second endpoint via a network, comprising: receiving at the first endpoint statistical data that are based on first videoconference data transmitted previously from the first endpoint to the second endpoint via the network, the statistical data determined at the second endpoint and relating to network performance characteristics during a known time-interval of transmitting the first videoconference data thereto; determining, based on the statistical data, an approximately optimized data transmission rate for the network performance characteristics; capturing second videoconference data relating to the same videoconference at a time that is later than capturing of the first videoconference data; adjusting the output bit rate of a video encoder associated with the first endpoint, so as to support transmission of videoconference data via the network at the approximately optimized data transmission rate; and, using the video encoder that is associated with the first endpoint, encoding the second videoconference data to provide output data at the adjusted output bit rate for being transmitted via the network at approximately the optimized data transmission rate.

According to an aspect of the instant invention there is provided a method of exchanging videoconference data between a first endpoint and a second endpoint via a network, comprising: transmitting first videoconference data from the first endpoint to the second endpoint via the network; receiving at the first endpoint statistical data transmitted from the second endpoint and relating to network performance characteristics during a known time-interval of transmitting the first videoconference data; determining, based on the statistical data, at least one of a target encoder bit rate of a video encoder associated with the first endpoint, a camera frame rate of a camera associated with the first endpoint, and a camera frame resolution of the camera associated with the first endpoint for providing an approximately optimized transmission rate of the videoconference data for the network performance characteristics; waiting until an I-frame of the videoconference data is to be encoded for transmission via the network; and, prior to beginning to encode the I-frame, adjusting the determined at least one of the video encoder bit rate, the camera frame rate, and the camera frame size for setting the video encoder output bit rate, such that videoconference data transmitted during another known time-interval are transmitted via the network at the approximately optimized transmission rate for the network performance characteristics.

According to an aspect of the instant invention there is provided a method of exchanging videoconference data between a first endpoint and a second endpoint via a network, comprising: transmitting videoconference data between the first endpoint and the second endpoint via the network; exchanging between the first endpoint and the second endpoint statistical data relating to network performance characteristics during at least a known time-interval of transmitting the videoconference data; determining, based on the statistical data, a plurality of approximately optimized data transmission rates for the network performance characteristics, including an approximately optimized data transmission rate for each direction of transmission between the first endpoint and the second endpoint; and, for each one of the first endpoint and the second endpoint, varying at least one of a video encoder bit rate, a camera frame-capture rate, and a camera frame-resolution, such that during a next known time-interval videoconference data is transmitted in each direction between the first endpoint and the second endpoint using at least one of the plurality of approximately optimized data transmission rates.

BRIEF DESCRIPTION OF THE DRAWINGS

Exemplary embodiments of the invention will now be described in conjunction with the following drawings, in which.

DETAILED DESCRIPTION OF EMBODIMENTS OF THE INVENTION

The following description is presented to enable a person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the scope of the invention. Thus, the present invention is not intended to be limited to the embodiments disclosed, but is to be accorded the widest scope consistent with the principles and features disclosed herein.

Figure 1:
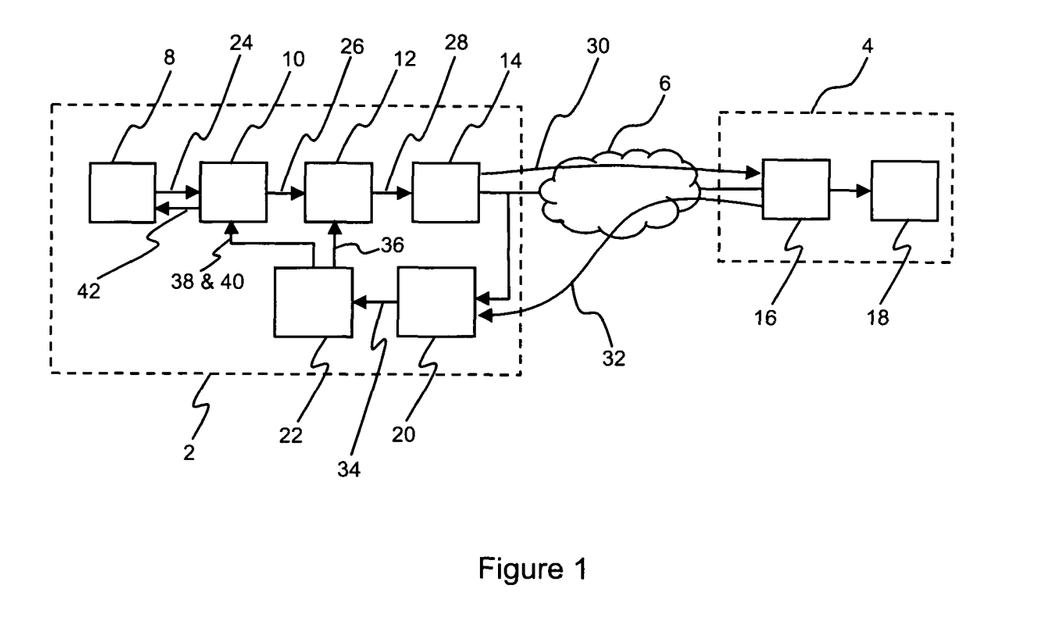
FIG. 1 is a simplified block diagram showing a point-to-point videoconference system according to an embodiment of the instant invention.

Referring to FIG. 1, shown is a simplified block diagram of a point-to-point videoconference system according to an embodiment of the instant invention. Two endpoints 2 and 4 are interconnected via an IP Network 6, e.g. the Internet. For clarity, the block diagram shows only the functions that are associated with one-way video transmission. As will be apparent, video transmission in the reverse direction, audio transmission and call control subsystems have been omitted. Optionally, the system that is shown in FIG. 1 is adapted to a multi-party videoconference, including P endpoints where P is greater than two.

Blocks 8 through 14 represent well-known functions in a videoconference system. A video camera represented at block 8 outputs raw video signal 24, which is fed to a camera interface represented at block 10. The camera interface includes at least color conversion and optionally one or more other video functions. Camera Control signal 42 controls, for example, frame rate and resolution. In the instant example, only one video camera is shown but optionally a plurality of video cameras and/or video sources is combined in the camera interface function at block 10 to produce a single, uncompressed video signal 26. Uncompressed video frames are fed at a given rate (frames per second, fps) and given resolution (frame size, resolution in width×height pixels) to a video encoder represented at block 12. The video encoder compresses the video signal using a predetermined method, such as for example H.264 (also known as MPEG-4 part 10 or MPEG-4 AVC), as negotiated during call set up. Compressed video 28 streams to a transmitter represented at block 14, containing lower layer RTP/UDP/IP stack, and then via the IP Network 6 to a receiver represented at block 16 in the remote endpoint 4. The signal 30 is considered to be a virtual IP connection.

For clarity, all remaining receiver functions of the receiving endpoint 4, which are not important to the understanding of the operation of the instant embodiment, are represented collectively at block 18. In addition, while the video camera, camera interface and video encoder are represented in FIG. 1 as discrete blocks 8, 10 and 12, respectively, optionally they are integrated in any of a number of ways that do not impact the operation of the instant embodiment.

The point-to-point videoconference system that is shown in FIG. 1 operates according to the standardized feedback method, indicated by signal 32, RTCP (RTP control protocol as defined in RFC 3550) to feed statistics relating to the received signal 30 back to the sending endpoint 2. In particular, the statistics include RTCP receiver report messages needed to calculate round trip delay, jitter, and packet loss. The RTCP receiver report messages are extended to send a 'user message' that contains an array of loss intervals statistics for the stream, since standard RTCP receiver reports do not include loss intervals. The loss intervals array, round trip delay and jitter values are needed in order to allow the target bandwidth calculator, which is represented at block 20, to calculate a recommended transmission rate (RecRate in kbits/s or kbps).

In the instant and non-limiting example the target bandwidth calculator block 20 is adapted from IETF (Internet Engineering Task Force) RFC 3448, "TCP Friendly Rate Control (TFRC): Protocol Specification." TFRC is intended for use at the transmission point of a UDP (User Datagram Protocol) connection. The major difference between this particular instantiation of TFRC and that recommended by IETF RFC 3448 is the frequency of exchanging stream transmission parameters (round trip delay, jitter and loss interval). Instead of transmitting these statistics from the receiving endpoint 4 at least every round trip time (usually on the order of milliseconds) as recommended by IETF RFC 3448, they are transmitted instead on the order of seconds, generally every N seconds where N is greater than or equal to one. Of course, transmitting the statistics every N seconds reduces the TCP-friendliness and responsiveness of this instantiation to congestion, but it also results in stabilizing the feedback loop that regulates the output rate of the video encoder based on the RecRate computed by TFRC's algorithm. This is because a typical video encoder manages its average bit rate over several seconds of video, as opposed to over a single frame or a few frames. As a result, the frequency of calculation of the recommended transmission rate (RecRate) is done, for example, every N=1 second so as to make changes to encoder average bit rate less frequent.

Another departure from TFRC as recommended by IETF RFC 3448 is that instead of using instantaneous round trip delay, this particular instantiation uses an exponentially weighted moving average (EWMA) of round trip delays received over an interval, for instance the above mentioned example N=1 second interval, to arrive at a more stable average value for round trip time (RTT) used in TFRC.

Referring still to FIG. 1, the target bandwidth calculator at block 20 uses the received loss intervals array, round trip delay and jitter values to determine a recommended transmission rate that is best optimized to the present condition of the IP network. Unlike DCCP, which also employs TFRC but merely uses a send buffer to regulate the sending rate, the target bandwidth calculator provides a signal 34 to a video parameter regulator represented at block 22. In particular, the signal 34 is indicative of the recommended send rate. The video parameter regulator subsequently processes the signal 34 to determine adjustments to one or more of the encoder bit rate, the camera frame rate and camera capture resolution. The output signal of the video parameter regulator block 22 is the encoder bit rate signal 36 provided to block 12, and the camera frame rate and capture resolution signals 38 and 40 provided to block 10. In addition, block 10 also provides to block 8 a Camera Control signal 42 for controlling, for example, frame rate and resolution, based on the signals 38 and 40. In this way, based on the respective control signals, the blocks 8 through 12 provide a video transmission signal 30 that is optimized to the present condition of the IP Network.

Figure 2:
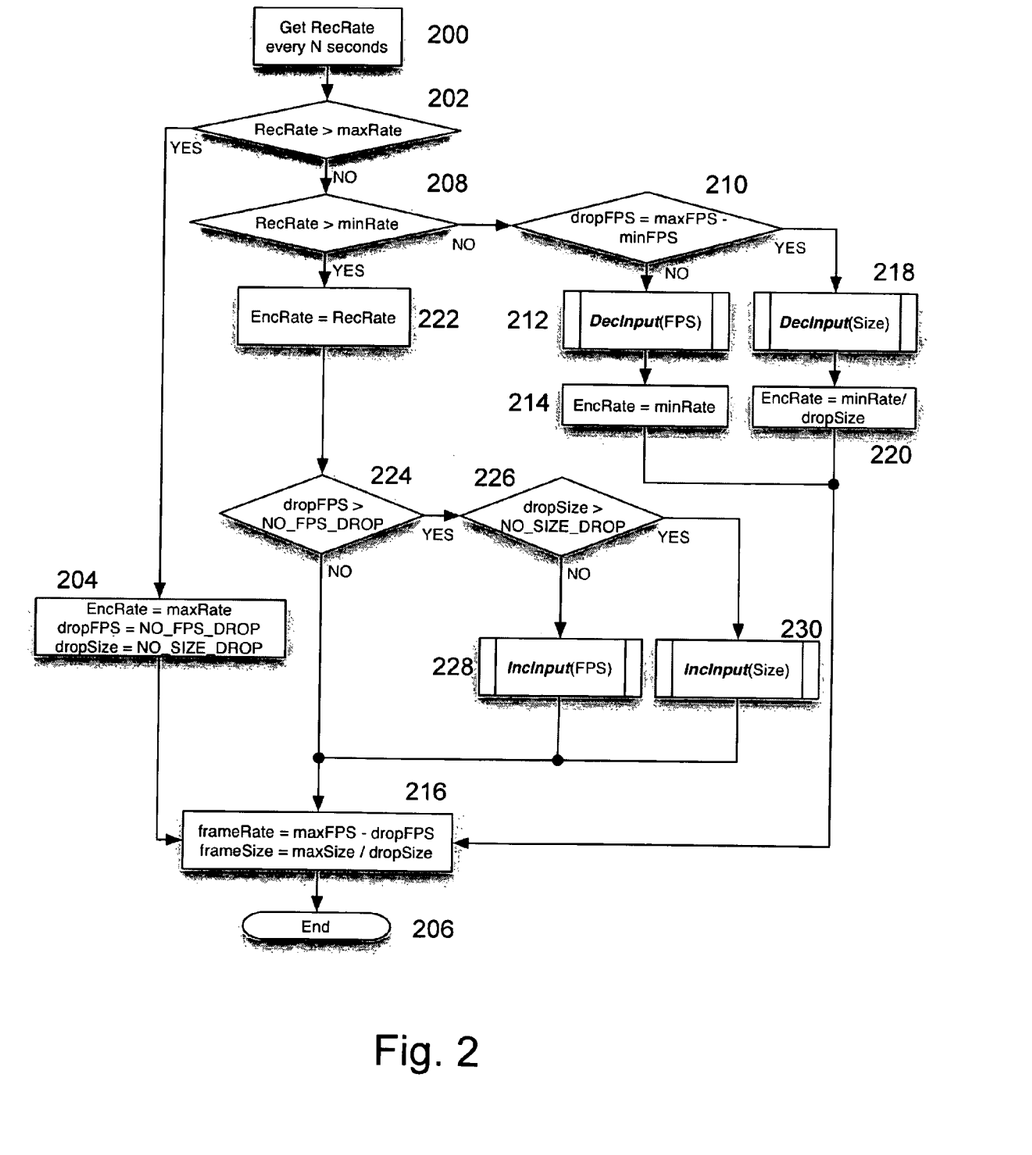
FIG. 2 is a simplified logic flow diagram, illustrating logic steps that are followed within the video parameter regulator block.

Referring now to FIG. 2, shown is a simplified flow diagram illustrating processing steps that are executed within the video parameter regulator block 22. The signal 34 that is provided from the target bandwidth calculator block 20 is received at the video parameter regulator block 22 at step 200. At decision step 202 it is determined whether the sending rate that is recommended by TFRC (RecRate) is greater than the maximum bit rate of the video encoder (maxRate). If it is determined that RecRate>maxRate, then at 204 the rate of the video encoder (EncRate) is set to maxRate the value of dropFPS (i.e. number of frames being dropped) is set to NO_FPS_DROP (i.e. set to zero) and dropSize (i.e. the scale factor for scaling resolution) is set to NO_SIZE_DROP (i.e. set to unity). Thus, at step 216 the frameRate=maxFPS−dropFPS, which is to say the frameRate is set to the value of maxFPS. Likewise, at 216 the frameSize=maxSize/dropSize, which is to say the frameSize is set to maxSize. The process then terminates at step 206.

If instead it is determined at decision step 202 that RecRate is not greater than maxRate, then at decision step 208 it is further determined whether RecRate is greater than the minimum bit rate of the video encoder (minRate). If it is determined at decision step 208 that RecRate is not greater than minRate, then at decision step 210 it is determined whether dropFPS=maxFPS−minFPS (i.e. is the current frameRate equal to the minimum acceptable camera frame rate?). If it is determined at decision step 210 that frameRate is not equal to minRate then at 212 the value of dropFPS is increased, as is described in greater detail below with reference to FIG. 3. Next, at step 214 EncRate is set to minrate, the minimum acceptable bit rate of the encoder (for maxSize). The process moves to step 216 and frameRate is set to the value maxFPS−dropFPS, and frameSize=maxSize/dropSize. Accordingly, when the process terminates at 206 the frame rate of the camera output is decreased compared to its current value and the camera video resolution (width×height pixels) is unchanged compared to its current value.

If instead it is determined at decision step 210 that frameRate is equal to minRate then at 218 the value of dropSize is increased, as is described in greater detail below with reference to FIG. 3. Next, at step 220 EncRate is set to minRate/dropSize. The process moves to step 216 where frameRate is set to the value maxFPS−dropFPS and frameSize is set to the value maxSize/dropSize. Accordingly, when the process terminates at 206 the frame rate of the camera output is unchanged compared to its current value and the camera video resolution (width×height pixels) is decreased compared to its current value.

Returning now to decision step 208, if it is determined that RecRate is greater than minRate then at step 222 EncRate is set to RecRate. Next, it is determined at decision step 224 whether dropFPS is greater than NO_DROP_FPS (i.e. is dropFPS>0?). If it is determined that dropFPS is not greater than NO_DROP_FPS, then at 216 the frameRate is set to maxFPS−dropFPS and the frameSize is set to maxSize/dropSize. The process terminates at 206.

If instead it is determined at decision step 224 that dropFPS is greater than NO_DROP_FPS (i.e. some frames currently are being dropped), then at 226 it is determined whether dropSize is greater than NO_SIZE_DROP (i.e. is the resolution being scaled by a factor greater than unity?). If it is determined at decision step 226 that dropSize is not greater than NO_SIZE_DROP (i.e. full resolution) then dropFPS is decreased as is described in greater detail below with reference to FIG. 4. Next, at 216 frameRate is set to maxFPS−dropFPS and frameSize is set to maxSize/dropSize. Accordingly, when the process terminates at 206 the frame rate of the camera output is increased compared to its current value and the camera video resolution (width×height pixels) is unchanged compared to its current value.

If instead it is determined at decision step 226 that dropSize is greater than NO_SIZE_DROP (i.e. the resolution is being scaled by a factor greater than unity) then the value of dropSize is decreased as is described in greater detail below with reference to FIG. 4. Next, at 216 frameRate is set to maxFPS−dropFPS and frameSize is set to maxSize/dropSize. Accordingly, when the process terminates at 206 the frame rate of the camera output is unchanged compared to its current value and the camera video resolution (width×height pixels) is increased compared to its current value.

The entire process described above starting at step 200 is repeated indefinitely every N seconds, for example every 1 sec.

Referring still to FIG. 2, the video parameter regulator block's recommended encoder bit rate (EncRate) remains within a predetermined range of minimum and maximum encoder bit rates. This constraint is imposed since during encoding of a given resolution there is a range of practical bit rates, going outside of which either is ignored by the encoder (e.g. bit rate of 64 kbps for a high definition 1920×1080 video), results in significant 'blockiness' of video and loss of quality, is not necessary (e.g. bit rate of 20 Mbps for a 176×144 video), or is not feasible on the network that is being utilized. Similarly, the video parameter regulator block's recommended frame rate and frame resolution also remain within a predetermined range.

Furthermore, if the recommended rate goes below the minimum bit rate tolerated by the encoder, the video parameter regulator block instead changes the rate at which the video source feeds the encoder. Given that the encoder has been initialized with the maximum frame rate, then reducing the rate at which the encoder receives frames helps reduce the resulting bit rate. For example, an encoder operating at 2 Mbps for a 640×480 video at 30 fps actually produces 1 Mbps if frames are fed to it at 15 fps instead.

Alternatively, if the recommended rate is below the minimum bit rate tolerated by the encoder and the current frame rate is already at the minimum, then the input video resolution is dropped.

As is shown in FIG. 2, response to network congestion involves first decreasing encoder bit rate, then decreasing frame rate and then finally frame resolution. The rate of increase is the reverse; the frame resolution is increased first, followed by increasing the frame rate and finally the encoder bit rate. Furthermore, the frame rate drop is recovered when the recommended bit rate increases.

The increase and decrease of frame rate and frame size is done in 'steps' so as to moderate the frequency of changes in frame rate. Decrease of frame rate and frame size is done only if the percentage of decrease in bit rate demanded by the recommended rate is greater than the percentage of decrease in bit rate if the frame rate or frame size is decreased by the given 'step'. This mechanism avoids frequent changes of frame rate and frame size when the recommended rate is just below the minimum encoder bit rate.

Figure 3:
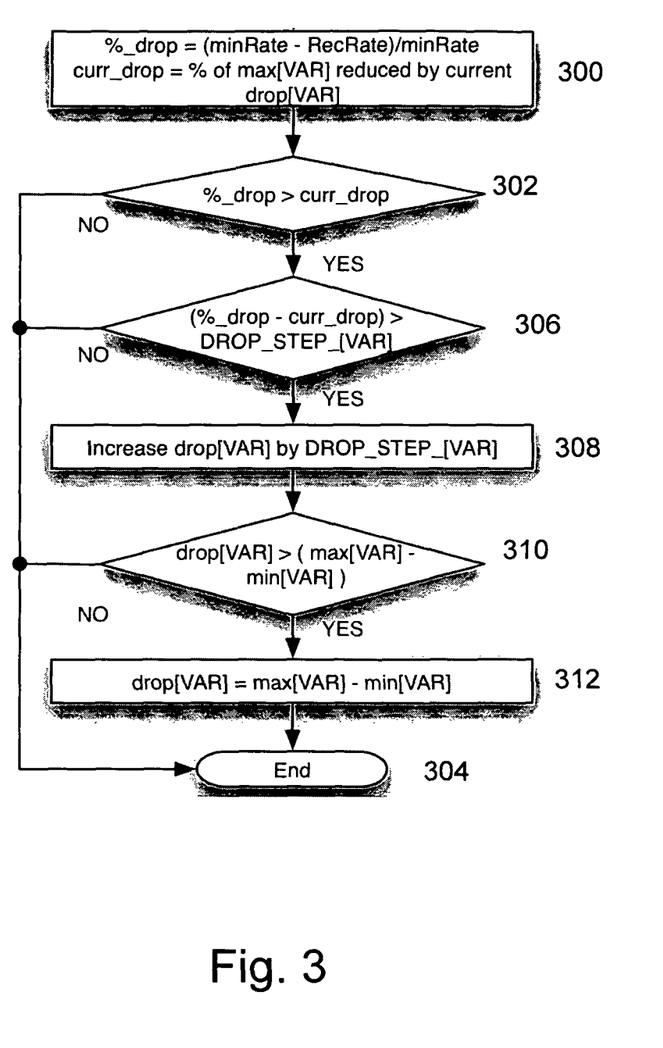
FIG. 3 is a simplified logic flow diagram, illustrating logic steps that are followed for increasing dropFPS or dropSize.

Referring now to FIG. 3, shown is a simplified flow diagram illustrating logic steps that are followed at step 212 of FIG. 2 for increasing dropFPS, or at step 218 of FIG. 2 for increasing dropSize, where VAR represents the appropriate one of FPS or SIZE. At 300 the value %_drop is calculated as (minrate−RecRate)/minRate, and the value curr_drop is calculated as % of max[VAR] reduced by current drop[VAR] (i.e. the amount by which the camera frame rate or camera frame size is less than the maximum camera frame rate or maximum camera frame size, respectively, expressed as a fraction of the respective max[VAR]). If at decision step 302 it is determined that %_drop is not greater than curr_drop, then the process proceeds to step 304 and terminates. If instead it is determined at decision step 302 that %_drop is greater than curr_drop, then the process proceeds to decision step 306. At decision step 306 it is determined if (%_drop−curr_drop is greater than DROP_STEP[VAR]). If no, then the process moves to 304 and terminates. If yes, then drop[VAR] is increased by DROP_STEP[VAR] at 308. At 310 it is determined whether drop[VAR] is greater than max[VAR]−min[VAR]. If no, then the value of drop[VAR] is acceptable and the process terminates at 304. If yes, then the value of drop [VAR] results in values that are outside the allowed range for VAR, and accordingly drop[VAR] is set to the value max[VAR]−min[VAR] at step 312, and the process terminates at 304.

Figure 4:
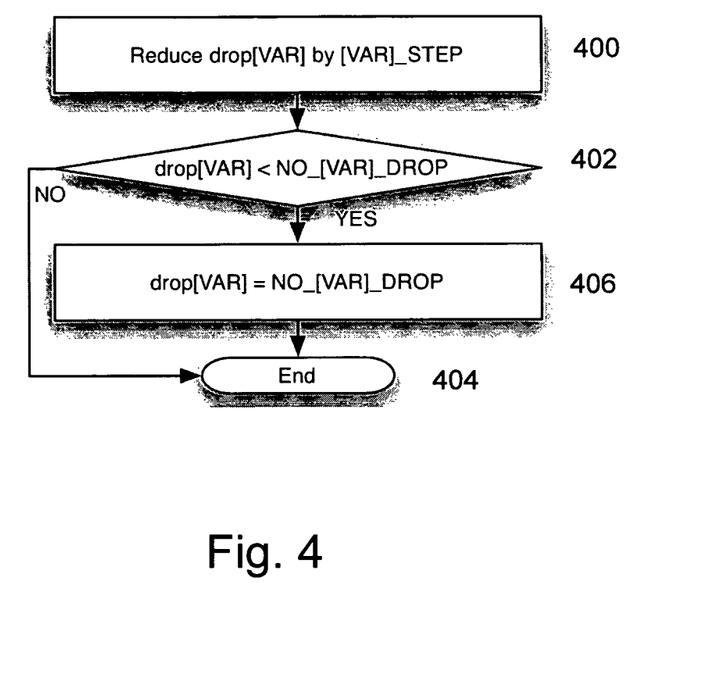
FIG. 4 is a simplified logic flow diagram, illustrating logic steps that are followed for decreasing dropFPS or dropSize; and, FIG. 5 is a simplified logic flow diagram showing processing steps for synchronizing encoder parameter changes to the encoding of an I-frame.

Referring now to FIG. 4, shown is a simplified flow diagram illustrating logic steps that are followed for decreasing dropFPS or dropSize, where VAR represents the appropriate one of FPS or SIZE. At 400 the value of drop[VAR] is reduced by the amount [VAR]_STEP, where VAR is either FPS or SIZE. At 402 it is determined whether drop[VAR] is less than NO_[VAR]_DROP. If no, then the process terminates at 404. If yes, then drop[VAR] is set to NO_[VAR]_DROP, and the process then terminates at 404.

Figure 5:
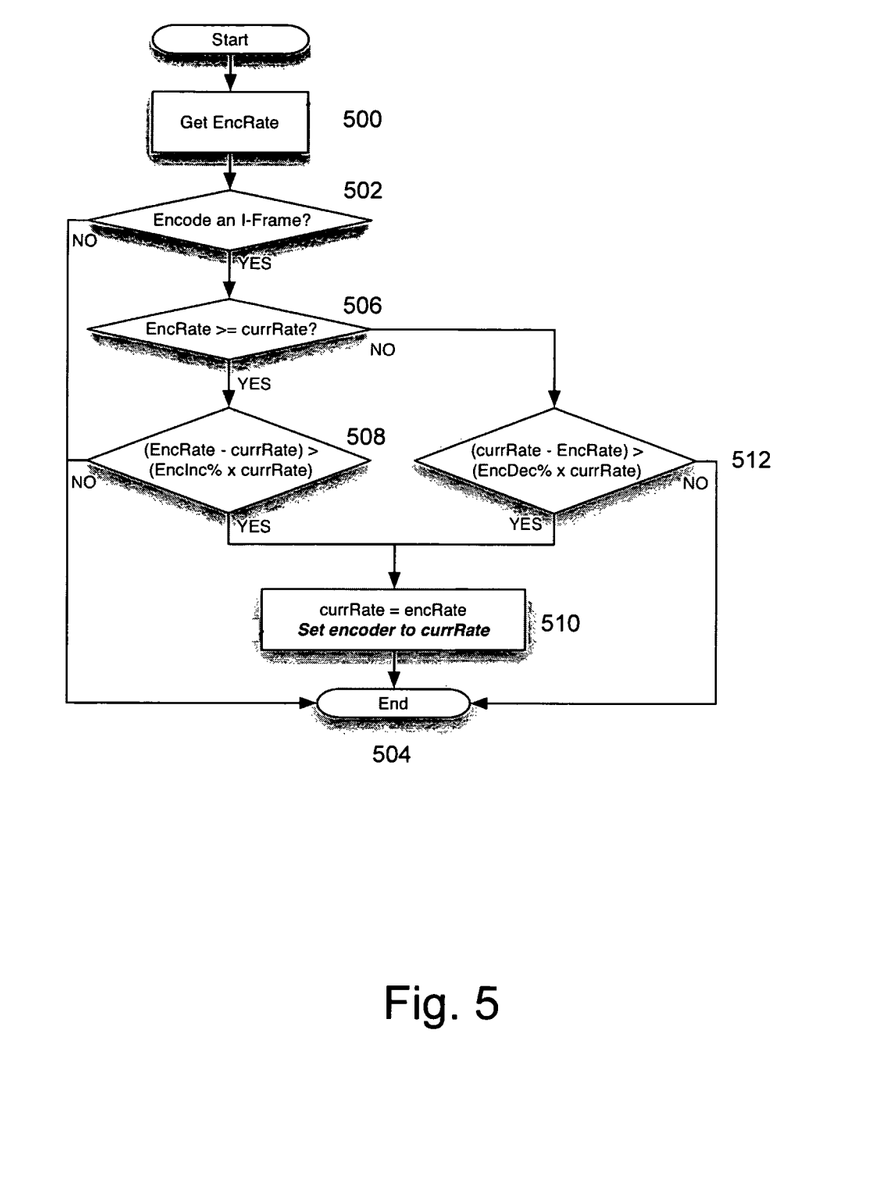

The logic steps shown in FIG. 5 are used for deciding when to actually change the encoder average bit rate based on the recommended encoder bit rate. In particular, it is desirable to invoke changes in a way that does not result in transmission of extra I-frames. Referring now to FIG. 5, the EncRate value as determined according to FIG. 2 is received at 500. At 502 it is determined if the encoder is about to encode an I-frame. For instance, the decision to encode an I-frame is made prior to the encoding of the I-frame by the encoder, or by external input to the encoder. If the determination at 502 is "no," then the process moves to 504 and terminates without setting encoder output bit rate.

If the determination at 502 is "yes," then it is further determined at 506 if EncRate≧currRate (the encoders current average bit rate in kbps). If the determination at 506 is "yes," then at 508 it is determined if the difference between EncRate (target encoder bit rate) and currRate (encoder current average bit rate) is greater than the product of EncInc % and the current rate, where EncInc % is the increase threshold value (range of 0 to 1). If the answer is yes, then the difference between EncRate and currRate is sufficiently large to justify changing the encoder output bit rate from currRate to EncRate at 510. If the answer at 508 is no, then the process moves directly to 504 and terminates.

If the determination at 506 is "no," then at 512 it is determined if the difference between currRate and EncRate is greater than the product of EncDec % and the current rate, where EncDec % is the decrease threshold value (range of 0 to 1). If the answer is yes, then the difference between EncRate and currRate is sufficiently large to justify changing the encoder output bit rate from currRate to EncRate at 510. The process terminates at 504. If the answer at 512 is no, then the process moves directly to 504 and terminates.

According to FIG. 5 the average encode bit rate (currRate) of the encoder is changed prior to the moment that the encoder starts encoding an I-frame. By making changes in currRate only at the I-Frame occurrences, the introduction of additional I-Frames when changing from one bit rate to another is avoided. Furthermore, the encoder bit rate is changed only if the amount of change exceeds a given threshold (EncInc % or EncDec % depending on whether the change is an increase or a decrease). In this way, small fluctuations in the recommended bit rate (RecRate) do not trigger a change in the encoder parameters, and therefore increase stability. In addition, instead of a using an absolute threshold for change, a percentage of current value is used. This further increases stability since when the current value is small, small changes in the recommended rate (RecRate) trigger a change in encoder bit rate, but when the current value is large, only large changes in the recommended rate (RecRate) trigger a change in encoder bit rate.

The percentage threshold for increase of encoder bit rate (EncInc %) is smaller than the percentage threshold for decrease of encoder bit rate (EncDec %). Accordingly, the algorithm requires a smaller percentage change to drop the encoder bit rate compared to the percentage change to increase the encoder bit rate. This conservative approach to changing encoder average bit rate helps to keep the overall produced bit rate below the maximum estimated by TFRC algorithm.

It will be understood that although the present invention is intended to improve performance in a best-effort network, improvements will also be gained if used in other networks e.g. a managed private network without QoS guarantees.

Furthermore, the embodiments of the invention have been described with respect to only one direction of the two-way videoconferencing experience. It will be apparent that in order to optimize performance of a two-way videoconference between the endpoints 2 and 4, each endpoint 2 and 4 must perform substantially the same steps, such that each endpoint 2 and 4 approximately optimizes the transmission rate associated therewith to the present condition of the IP network. Factors other than merely the present condition of the IP network may also affect the optimized transmission rates determined by each endpoint 2 and 4. For instance, if endpoint 2 feeds back information relating to diminished processing capabilities, such as for example if endpoint 2 is processing simultaneously one or more additional audio visual streams, then endpoint 4 adjusts its transmission rate to optimize approximately the videoconferencing experience at endpoint 2. Thus, broadly stated, the approximately optimized transmission rate is a function of a plurality of parameters, including but not limited to the current condition of the IP network, the current processing requirements at one or both endpoints, and a risk tolerance factor. The risk tolerance factor specifies for instance a threshold transmission rate based on historical condition of the IP network. Thus, by setting the risk tolerance to a low level the transmission rate is limited to values that are accommodated by the IP network even under congested conditions. Alternatively, the risk tolerance is set to a higher level to allow faster transmission rates but at the risk that if the network congestion increases too much there will be delays in streaming the videoconference data. Optionally, the number of endpoints is greater than two. For instance, a multi-party videoconference includes P endpoints, where P is greater than two. Furthermore, the number of endpoints P varies during a videoconference, as some endpoints drop out or new endpoints join the videoconference. Optionally, some of the endpoints P merely observe the videoconference but do not transmit audiovisual data back to any of the other endpoints, such as for instance when two active endpoints are engaged in a debate and the remaining passive endpoints are merely spectators. The two active endpoints provide feedback one to the other as described above for optimizing transmission rates to the current conditions of the IP network. However, the remaining passive endpoints merely feedback statistical data to the two active endpoints, for allowing the two active endpoints to optimize approximately transmission rates to the remaining passive endpoints. Alternatively, the other endpoints feedback statistical data to the two active endpoints to ensure the transmission is synchronized and viewable and optimization is obviated.

Numerous other embodiments may be envisaged without departing from the scope of the invention.

What is claimed is:

1. A method of exchanging videoconference data between a first endpoint and a second endpoint via a network, comprising:
   receiving at the first endpoint statistical data that are based on first videoconference data transmitted previously from the first endpoint to the second endpoint via the network, the statistical data determined at the second endpoint and relating to network performance characteristics during a known time-interval of transmitting the first videoconference data thereto;
   determining, based on the statistical data, a recommended data transmission rate for the network performance characteristics;
   capturing second videoconference data relating to the same videoconference at a time that is later than capturing of the first videoconference data at a settable frame rate and video resolution;
   adjusting the output bit rate of a video encoder associated with the first endpoint, so as to support transmission of videoconference data via the network at approximately the recommended data transmission rate if the recommended data transmission rate falls within a predetermined range of output bit rates tolerated by the video encoder;
   if the recommended data transmission rate falls outside said predetermined range, adjusting the frame rate or video resolution to maintain the output bit rate of said video encoder within said predetermined range; and
   encoding the second videoconference data with the video encoder to provide output data for transmission via the network.

2. A method according to claim 1, wherein the exchange of videoconference data between the first endpoint and the second endpoint is bi-directional, and comprising:
   receiving at the second endpoint statistical data that are based on third videoconference data transmitted previously from the second endpoint to the first endpoint via the network, the statistical data determined at the first endpoint and relating to network performance characteristics during a known time-interval of transmitting the third videoconference data thereto;
   determining, based on the statistical data, a recommended data transmission rate for the network performance characteristics;
   capturing fourth videoconference data relating to the same videoconference at a time that is later than capturing of the third videoconference data at a settable frame rate and video resolution;
   adjusting the output bit rate of a video encoder associated with the second endpoint, so as to support transmission of videoconference data via the network at approximately the recommended data transmission rate if the recommended data transmission rate falls within a predetermined range of output bit rates tolerated by the video encoder associated with the second endpoint;

if the recommended data transmission rate is falls outside said predetermined range, adjusting the frame rate or video resolution to maintain the output bit rate of said video encoder associated with the second endpoint within said predetermined range; and encoding the fourth videoconference data with the video encoder associated with the second endpoint to provide output data for transmission via the network.

3. A method according to claim 1, wherein the network is a best-effort network.

4. A method according to claim 1, wherein the network is the Internet.

5. A method according to claim 1, wherein the magnitude of the known time-interval is on the order of seconds.

6. A method according to claim 1, wherein the statistical data includes at least a round trip delay value, a jitter value, and an array of loss interval statistics.

7. A method according to claim 6, wherein the round trip delay value is an exponentially weighted moving average of round trip delays over the known time-interval.

8. A method according to claim 1, wherein adjusting the output bit rate of the video encoder associated with the first endpoint is performed only at the beginning of encoding of an I-frame of the videoconference data.

9. A method of exchanging videoconference data between a first endpoint and a second endpoint via a network, comprising:

transmitting first videoconference data from the first endpoint to the second endpoint via the network;

receiving at the first endpoint statistical data transmitted from the second endpoint and relating to network performance characteristics during a known time-interval of transmitting the first videoconference data;

determining, based on the statistical data, a target encoder bit rate of a video encoder associated with the first endpoint;

waiting until an I-frame of the videoconference data is to be encoded for transmission via the network; and, prior to beginning to encode the I-frame, adjusting the output bit rate of a video encoder associated with the first endpoint, so as to support transmission of videoconference data via the network at approximately the recommended data transmission rate if the recommended data transmission rate falls within a predetermined range of output bit rates tolerated by the video encoder; and if the recommended data transmission rate falls outside said predetermined range, adjusting the frame rate or video resolution to maintain the output bit rate of said video encoder within said predetermined range.

10. A method according to claim 9, wherein the network is a best-effort network.

11. A method according to claim 9, wherein the network is the Internet.

12. A method according to claim 9, wherein the magnitude of the known time-interval is on the order of seconds.

13. A method according to claim 9, wherein the statistical data includes at least a round trip delay value, a jitter value, and an array of loss interval statistics.

14. A method according to claim 13, wherein the round trip delay value is an exponentially weighted moving average of round trip delays over the known time-interval.

15. A method of exchanging videoconference data between a first endpoint and a second endpoint via a network, comprising:

transmitting videoconference data between the first endpoint and the second endpoint via the network;

exchanging between the first endpoint and the second endpoint statistical data relating to network performance characteristics during at least a known time-interval of transmitting the videoconference data;

determining, based on the statistical data, a recommended data transmission rate for each direction of transmission between the first endpoint and the second endpoint; and, for each one of the first endpoint and the second endpoint, adjusting the output bit rate of a video encoder associated therewith, so as to support transmission of videoconference data via the network at approximately the recommended data transmission rate if the recommended data transmission rate falls within a predetermined range of output bit rates tolerated by the video encoder;

if the recommended data transmission rate falls outside said predetermined range, adjusting the frame rate or video resolution to maintain the output bit rate of the video encoder within said predetermined range; and encoding the second videoconference data with the video encoder to provide output data for transmission via the network.

16. A method according to claim 15, wherein the network is a best-effort network.

17. A method according to claim 15, wherein the network is the Internet.

18. A method according to claim 15, wherein the magnitude of the at least a known time-interval is on the order of seconds.

19. A method according to claim 15, wherein the statistical data relating to network performance characteristics includes an array of loss interval statistics, round trip delay value and jitter value.

20. A method according to claim 15, wherein the round trip delay value is an exponentially weighted moving average of round trip delays over the at least a known time-interval.

21. A method according to claim 15, wherein the adjusting of the bit rate, frame rate, or video resolution occurs at a time that an I-frame of the videoconference data is being encoded at the respective endpoint.

22. A method according to claim 1, wherein if the recommended data transmission rate is above a maximum of said predetermined range, the output bit rate of the video encoder is adjusted to the maximum, and the frame rate and video resolution are set at maximum values therefor.

23. A method according to claim 22, wherein if the recommended data transmission rate falls within said predetermined range, the output bit rate of the video encoder is set to the recommended transmission rate, and if the frame rate is not at its maximum value, the frame rate is increased if the video resolution is at its maximum value, and if the video resolution is not at its maximum value, the video resolution is increased.

24. A method as claimed in claim 23, wherein if the recommended data transmission rate lies below a minimum of said predetermined range, a determination is made as to whether the current frame rate is equal to the minimum value therefor, and if not, the frame rate is decreased and the output bit rate set to the minimum, and if yes the video resolution is decreased the output bit rate set to the minimum.

* * * * *